(12) United States Patent
Hasegawa et al.

(10) Patent No.: US 6,624,112 B2
(45) Date of Patent: Sep. 23, 2003

(54) HYDROGENOLYSIS CATALYST

(75) Inventors: Koji Hasegawa, Ichikawa (JP); Toshihiko Sakurai, Tokyo (JP)

(73) Assignee: N.E. Chemcat Corporation, Tokyo (JP)

( * ) Notice: Subject to any disclaimer, the term of this patent is extended or adjusted under 35 U.S.C. 154(b) by 0 days.

(21) Appl. No.: 10/067,242

(22) Filed: Feb. 7, 2002

(65) Prior Publication Data

US 2002/0169074 A1 Nov. 14, 2002

(30) Foreign Application Priority Data

Mar. 6, 2001 (JP) ........................................ 2001-061545

(51) Int. Cl.⁷ .......................... B01J 23/44; B01J 23/52; B01J 23/66
(52) U.S. Cl. .................. 502/339; 502/180; 502/182; 502/184; 502/185; 502/325; 502/330; 502/339
(58) Field of Search ................................ 502/180, 182, 502/184, 185, 325, 330, 339

(56) References Cited

U.S. PATENT DOCUMENTS

| 5,489,565 A | 2/1996 | Cheung et al. |
| 5,629,462 A | 5/1997 | Rao |

FOREIGN PATENT DOCUMENTS

| JP | 62-87542 | 4/1987 |
| JP | 3-47143 | 2/1991 |
| JP | 3-99036 | 4/1991 |
| JP | 6-21088 | 3/1994 |
| JP | 2797527 | 7/1998 |
| JP | 2800302 | 7/1998 |
| JP | 10-330331 | 12/1998 |

OTHER PUBLICATIONS

Derwent Publications, AN 1995–010997, XP–002203980, JP 6–296866 Oct. 25, 1994.

Derwent Publications, AN 1997–173706, XP–002203981, JP 9–038501, Feb. 10, 1997.

Derwent Publications, AN 1992–303570, XP–002203982, JP 4–208257, Jul. 29, 1992.

*Primary Examiner*—Elizabeth D. Wood
(74) *Attorney, Agent, or Firm*—Oblon, Spivak, McClelland, Maier & Neustadt, P.C.

(57) ABSTRACT

A hydrogenolysis catalyst that possesses high hydrogenolysis performance at low temperatures and during the debenzylation reaction of a compound wherein a benzyl group combines with a nitrogen atom, which is difficult for conventional catalysts. The catalyst comprises (a) a component comprising at least one compound selected from the group consisting of palladium oxide, palladium oxide monohydrate, and palladium hydroxide wherein the oxidation state of palladium is divalent, and (b) a component comprising at least one element selected from the group consisting of Pt, Ru, Rh, Ir and Au, carried on a non-organic porous substance.

21 Claims, No Drawings

HYDROGENOLYSIS CATALYST

BACKGROUND OF THE INVENTION

1. Field of the Invention

The present invention relates to a hydrogenolysis catalyst.

2. Background Art

Hydrogenolysis has been used as a means for synthesizing intermediate chemical products. Hydrodesulfurization reaction, dehalogenation reaction, ester hydrogenolysis, debenzylation reaction, and the like can be given as types of hydrogenolysis reactions. As known catalysts, Raney nickel is used in the hydrodesulfurization reaction, Pd/carbon and Pt/carbon are used in the dehalogenation reaction, and $PtO_2$ and Pd/carbon are used in ester hydrogenolysis. Also, as known catalysts for the debenzylation reaction, Pd/carbon, Pd black, Raney nickel, Rh/carbon, Ru/carbon, Re/carbon (Japanese Patent Application Laid-open No. 87542/1987), Pd/carbon, palladium oxide, palladium black or palladium chloride (Japanese Patent Application Laid-open No. 47143/1991), $PtO_2$, Pd/carbon, Rh/carbon, $RuO_2$, and the like (Japanese Patent Application Laid-open No. 99036/1991), and Pd/carbon (Japanese Patent Application Laid-open No. 330331/1998) have been disclosed.

The above hydrogenolysis catalysts, however, fail to provide sufficient activity at low temperatures. Also, the use of these catalysts during a debenzylation reaction of a compound in which nitrogen combines with a benzyl group gives rise to a problem that the reaction does not proceed easily. Therefore, a catalyst exhibiting high hydrogenolysis performance under these conditions has been demanded.

In order to solve the above problems, the objective of the present invention is to provide a catalyst possessing a high activity at low temperatures and high hydrogenolysis performance during the debenzylation reaction of a compound in which nitrogen combines with a benzyl group.

As a result of extensive studies in order to find a catalyst possessing high hydrogenolysis performance, the inventors of the present invention have discovered that a catalyst prepared by combining a particular noble metal element with a compound containing divalent palladium can solve the above problems. This finding has led to the completion of the present invention.

SUMMARY OF THE INVENTION

Specifically, the present invention provides a hydrogenolysis catalyst comprising (a) a component comprising at least one compound selected from the group consisting of palladium oxide, palladium oxide monohydrate, and palladium hydroxide, wherein the oxidation state of palladium is divalent, and (b) a component comprising at least one element selected from the group consisting of Pt, Ru, Rh, Ir, and Au, both carried on a non-organic porous substance.

Other objects, features and advantages of the invention will hereinafter become more readily apparent from the following description.

DETAILED DESCRIPTION OF THE INVENTION AND PREFERRED EMBODIMENT

The hydrogenolysis catalyst of the present invention (hereinafter referred to as "catalyst") is prepared by causing the above components (a) and (b) to be carried on a non-organic porous substance by a conventional method.

The component (a) of the catalyst of the present invention comprises at least one of palladium oxide (PdO), palladium oxided monohydrate (PdO $H_2O$), and palladium hydroxide $(Pd(OH)_2)$, wherein the oxidation state of Pd is divalent. PdO, PdO $H_2O$ and $Pb(OH)_2$ may be used either individually or in a combination of two or more in component (a).

A major portion of the Pd contained in the component (a) of the present invention must be divalent. If a major portion of the component comprises Pd with a valence greater or lesser than 2, the required activity of the catalyst of the present invention cannot be achieved.

The valence of the above Pd can be verified by X-ray Photoelectron Spectroscopy (XPS) measurement. XPS is a method for analyzing the state of chemical bond of the atoms present close to the surface of a specimen by irradiating the surface with x-rays and measuring the amount of energy and number of photoelectrons emitted due to the photoelectric effect. Information such as atomic valence can be obtained from the resulting chemical shift. In the analysis of the atomic valence of Pd, Pd3d5/2 peaks with a binding energy of 334–340eV can be employed. Specifically, the above position of the peak for Pd metal is 335.1–335.5 eV, the position of the peak for divalent Pd is 336.3 eV, and the position of the peak for tetravalent Pd is 337.9 eV ("Handbook of X-ray Photoelectron Spectroscopy", Perkin-Elmer Co., (1992)). From these peak positions, it is possible to determine the atomic valence of Pd.

Therefore, the amount for each atomic valence of Pd can be measured by calculating the area of each Pd3d5/2 peak. In the present invention, the percentage of the peak area for divalent Pd in the total sum of the Pd3d5 peak areas calculated in this manner is preferably 80% or more, with 90% or more being particularly preferable.

Although there are no specific limitations to the supported amount of the divalent Pd compound in the catalyst of the present invention, the amount of Pd is preferably 0.01–50 weight %, and even more preferably 0.1–30 weight %, based on the mass of catalyst. If the supported amount is less than 00.1 weight %, activity becomes insufficient. If the supported amount is greater than 50 weight %, the activity per unit mass of Pd easily declines and the use efficiency of the expensive Pd does not increase.

The component (b) of the catalyst of the present invention is at least one element selected from the group consisting of Pt, Ru, Rh, Ir, and Au. There are no specific limitations to the state of these elements; for example metals, oxides, hydroxides, or salts of these elements maybe used. A combination of more than one state may also be used. Among these, oxides and hydroxides are preferable. These elements may be used independently or in combination of two or more as the component (b).

There are no particular limitations to the support amount for the component (b), the mass ratio as a metal in comparison with the component (a) is preferably 0.25 or less. If the mass ratio of the component (b) exceeds 0.25, improved activity cannot be obtained.

As the non-organic porous substance used as the carrier in the catalyst of the present invention, activated carbon, graphite carbon, acetylene black, silica/alumina, titania, zirconia, and the like can be given. Among these, activated carbon, graphite carbon and acetylene black are preferable. These may be used either individually or in combinations of two or more.

The BET specific surface area of the non-organic porous substance is preferably 100 $m^2/g$ or more. If the specific surface area is less than 100 $m^2/g$, the dispersion of the components (a) and (b) supported on the non-organic porous substance worsens and the activity tends to decrease.

There are no specific limitations to the preparation method for the catalyst of the present invention. Conventional methods of catalyst preparation such as impregnation, precipitation, and water absorption methods may be used. One example is a simultaneous supporting method by coprecipitation wherein a mixed solution of raw material salts of components (a) and (b) is added to the carrier powder. In another method, first of all, a raw material salt solution of one of the components (a) and (b) is impregnated in the carrier powder and then dried, then the raw material salt solution of the other component is impregnated in the carrier powder and dried. As still another method, a method of mixing a carrier powder that supports the component (a) and a carrier powder that supports the component (b) can be given.

As a starting raw material for the components (a) and (b) used in the preparation of the catalyst of the present invention, chloride, hydrochloride, nitrate, sulfate, organic acid salt, ammine salt, alkaline salt, organic complex, and the like can be given without any specific limitations.

Specifically, as the raw material for the component (a), for example, divalent palladium chloride, sodium chloropalladate, potassium chloropalladate, palladium nitrate, palladium acetate, and the like can be given. Among the raw materials of the component (b), given as the raw materials for Pt are chloroplatinic acid, potassium chloroplatinate, and the like; as the raw materials for Ru, ruthenium chloride, ruthenium nitrate, and the like; as the raw materials for Rh, rhodium chloride, rhodium sulfate, and the like; as the raw material for Ir, iridium sulfate, iridium chloride, and the like; as the raw material for Au, chloroauric acid, sodium gold sulfite, gold acetate, and the like.

The catalyst of the present invention made in the above manner can be used in various types of hydrogenolysis. In particular, hydrogenolysis reaction under low temperature conditions of about room temperature, and debenzylation reaction of the compound in which nitrogen combines with a benzyl group show excellent catalytic effects.

EXAMPLES

The present invention will be described in more detail by way of examples, comparative examples, and performance evaluation examinations, which should not be construed as limiting the present invention. In the Examples and Comparative Examples, unless otherwise indicated, % indicates weight %.

Example 1

50 g of activated carbon powder (manufactured by Takeda Chemical Industries, Ltd.) was added to 500 ml of deionized water, in which 2.6 g of potassium hydroxide was dissolved. The mixture was stirred to obtain a slurry. 50 ml of a mixed solution of a potassium chloropalladate aqueous solution, which contains 2.5 g of a divalent Pd, and a chloroplatinic acid aqueous solution, which contains 0.25 g of Pt, was added dropwise to the slurry and then stirred for 60 minutes. Next, the slurry was filtered and washed to obtain 52 g of a catalyst powder with 5% of Pd and 0.5% of Pt, as metals, carried on carbon (A—1).

Example 2

A catalyst powder with 5% Pd—0.5% Rh carried on carbon (A-2), a catalyst powder with 5% Pd—0.5% Ru carried on carbon (A-3), a catalyst powder with 5% Pd—0.5% Ir carried on carbon (A-4), and a catalyst powder with 5% Pd—0.5% Au carried on carbon (A-5), 52 g each, were obtained in the same manner as in Example 1 except that a rhodium chloride aqueous solution containing 0.25 g of Rh, a ruthenium chloride aqueous solution containing 0.25 g of Ru, an chloroiridic acid aqueous solution containing 0.25 g of Ir, and a chloroauric acid aqueous solution containing 0.25 g of Au were respectively used in place of the chloroplatinic acid aqueous solution containing 0.25 g of Pt.

Example 3

A catalyst powder with 4% Pd—1% Pt carried on carbon (A-6) and a catalyst powder with 4.95% Pd—0.05% Pt carried on carbon (A-7), 52 g each, were obtained in the same manner as in Example 1 except that 2.0 g Pd and 1.0 g Pt, and 2.48 g of Pd and 0.025 g of Pt, were used respectively for (A-6) and (A-7) instead of 2.5 g Pd and 0.25 g Pt. 1% of nonvalent Pd and 99% of divalent Pd were present in the catalyst powder (A-7) when measured by X-ray photoelectron spectroscopy.

Example 4

0.05 ml and 0.1 ml of hydrazine hydrate were added to an aqueous slurry of the catalyst powder with 4.95% Pd—0.05% Pt carried on carbon (A-7) obtained in Example 3 to reduce the catalyst (A-7) thereby obtaining catalyst powders with 4.95% Pd—0.05% Pt carried on carbon (A-8) and (A-9) respectively. 10% of nonvalent Pd and 90% of divalent Pd were present in the catalyst powder (A-8) and 21% of nonvalent Pd and 79% of divalent Pd were present in the catalyst powder (A-9), when measured by X-ray photoelectron spectroscopy.

Example 5

A catalyst powder with 10% Pd carried on carbon and a catalyst powder with 1% Pt carried on carbon were separately prepared in accordance with the precipitation method of Example 1. An equal amount of these two powders were mixed to obtain a catalyst powder with 5% Pd—0.5% Pt carried on carbon (A-10).

Example 6

A catalyst powder with 4.95% Pd—0.05% Ir carried on carbon (A-11) was obtained in the same manner as in Example 1, except that a mixed solution of a potassium chloropalladate aqueous solution containing 2.48 g of Pd and an chloroiridic acid aqueous solution containing 0.025 g of Ir was used in place of the mixed solution of a potassium chloropalladate aqueous solution containing 2.5 g of Pd and a chloroplatinic acid aqueous solution containing 0.25 g of Pt.

Comparative Example 1

50 g of activated carbon powder (manufactured by Takeda Chemical Industries, Ltd.) was added to 500 ml of deionized water, in which 2.6 g of potassium hydroxide was dissolved, and the mixture was stirred to obtain a slurry. 50 ml of a potassium chloropalladate aqueous solution containing 2.5 g of Pd was added dropwise to the slurry and then stirred for 60 minutes. 1 ml of hydrazine hydrate was added to the slurry, reduced, filtered, and washed to obtain a catalyst powder with 5% Pd, as metals, carried on carbon (B-1).

Performance Evaluation Examination 1

40 ml of benzyl alcohol, 60 ml of methanol as the solvent, and 0.2 g of the catalyst powders of the Examples and Comparative Examples were reacted in a hydrogenolysis reaction vessel equipped with a stirrer under the conditions of room temperature (25° C.), rotating speed of 300 rpm, and a hydrogen pressure of 0.1 MPa. The hydrogen absorption amount was measured for 30 minutes after initiation of reaction and the benzyl alcohol decomposition activity of the catalyst was evaluated. Gas chromatography analysis confirmed the presence of only benzyl alcohol and the toluene hydrogenolysis material. The results are shown in Table 1.

TABLE 1

| Catalyst | | Hydrogen adsorption amount (ml) |
|---|---|---|
| Example 1 | A-1 | 3665 |
| Example 2 | A-2 | 2330 |
| | A-3 | 1165 |
| | A-4 | 2895 |
| | A-5 | 2090 |
| Example 3 | A-6 | 2625 |
| | A-7 | 3005 |
| Example 4 | A-8 | 2485 |
| | A-9 | 1365 |
| Example 5 | A-10 | 3250 |
| Example 6 | A-11 | 2195 |
| Comparative Example 1 | B-1 | 786 |

As shown in Table 1, the decomposition activity of the catalyst of the present invention is 1.7–4.6 times greater than the conventional catalyst with 5% Pd carried on carbon of the Comparative Example when the reaction is conducted at room temperature.

Performance Evaluation Examination 2

20 g of dibenzyl ether, 50 ml of tetrahydrofuran as the solvent, and 0.2 g of the catalyst powders A-2, A-4, A-5, A-7, and B-1 were reacted in a pressure-type hydrogenolysis reaction vessel equipped with a stirrer under the conditions of a reaction temperature of 50° C., a rotating speed of 2000 rpm, and a hydrogen pressure of 0.2 MPa. The hydrogen absorption amount was measured for 30 minutes after initiation of reaction and the dibenzyl ether decomposition activity of the catalyst was evaluated. Gas chromatography analysis confirmed the presence of only dibenzyl ether and the toluene hydrogenolysis material. The results are shown in Table 2.

TABLE 2

| Catalyst | | Hydrogen adsorption amount (ml) |
|---|---|---|
| Example 2 | A-2 | 3881 |
| | A-4 | 3844 |
| | A-5 | 4219 |
| Example 3 | A-7 | 4333 |
| Comparative Example 1 | B-1 | 418 |

As shown in Table 2, the decomposition activity of the catalyst of the present invention is 9.2–10.3 times greater than the conventional catalyst with 5% Pd carried on carbon of the Comparative Example.

Performance Evaluation Examination 3

9.2 g of N-phenylbenzylamine, 50 ml of N,N-dimethylacetamide as the solvent, and 0.2 g of the catalyst powders A-4, A-5, A-7, and B-1 were reacted in a pressure-type hydrogenolysis reaction vessel equipped with a stirrer under the conditions of a reaction temperature of 50° C., a rotating speed of 2000 rpm, and a hydrogen pressure of 0.2 MPa. The hydrogen absorption amount was measured for 30 minutes after initiation of the reaction and the N-phenylbenzylamine decomposition activity of the catalyst was evaluated. N-phenylbenzylamine and the hydrogenolysis materials toluene and aniline were detected by gas chromatography. The results are shown in Table 3.

TABLE 3

| Catalyst | | Hydrogen adsorption amount (ml) |
|---|---|---|
| Example 2 | A-4 | 968 |
| | A-5 | 904 |
| Example 3 | A-7 | 950 |
| Comparative Example 1 | B-1 | 291 |

As shown in Table 3, the decomposition activity of the catalyst of the present invention is 3.1–3.3 times greater than the conventional catalyst with 5% Pd carried on carbon of the Comparative Example during the hydrogenolysis of N-phenylbenzylamine in which a nitrogen atom combines with the benzyl group.

EFFECT OF THE INVENTION

When compared to conventional hydrogenolysis catalysts, the catalyst of the present invention possesses superior hydrogenolysis catalytic performance when the reaction temperature is a low temperature such as room temperature and when the object of the debenzylation reaction is a compound in which a nitrogen atom combines with a benzyl group.

Therefore, the catalyst of the present invention can be used advantageously in hydrodesulfurization reactions, dehalogenation reactions, hydrogenolysis of esters, debenzylation reactions, and the like.

Obviously, numerous modifications and variations of the present invention are possible in light of the above teachings. It is therefore to be understood that, within the scope of the appended claims, the invention may be practiced otherwise than as specifically described herein.

What is claimed is:

1. A catalyst comprising:
   (a) a component in which the major portion of palladium is in the divalent oxidation state comprising at least one compound selected from the group consisting of palladium oxide, palladium oxide monohydrate, and palladium hydroxide, and
   (b) a component comprising at least one element selected from the group consisting of Pt, Ru, Rh, Ir and Au, both carried on a non-organic porous substance.

2. The catalyst of claim 1, wherein the amount of divalent palladium present in the palladium oxide, palladium oxide monohydrate and palladium hydroxide of the component (a) is 80% or more.

3. The catalyst of claim 1, wherein the amount of divalent palladium present in the palladium oxide, palladium oxide monohydrate and palladium hydroxide of the component (a) is 90% or more.

4. The catalyst of claim 1, wherein the mass ratio of the metals of the component (b) to the component (a) is 0.25 or less.

5. The catalyst of claim 1, wherein the amount of palladium ranges from 0.01 to 50 weight % of the catalyst.

6. The catalyst of claim 1, wherein the amount of palladium ranges from 0.1 to 30 weight % of the catalyst.

7. The catalyst of claim 1, wherein component (b) comprises Pt.

8. The catalyst of claim 1, wherein component (b) comprises Ru.

9. The catalyst of claim 1, wherein component (b) comprises Rh.

10. The catalyst of claim 1, wherein component (b) comprises Ir.

11. The catalyst of claim 1, wherein component (b) comprises Au.

12. The catalyst of claim 1, wherein component (b) comprises a metal.

13. The catalyst of claim 1, wherein component (b) comprises an oxide.

14. The catalyst of claim 1, wherein component (b) comprises a salt.

15. The catalyst of claim 1, wherein component (b) comprises a hydroxide.

16. The catalyst of claim 1, wherein the non-organic porous substance has a BET specific surface area of 100 $m^2/g$ or more.

17. The catalyst of claim 1, wherein the non-organic porous substance comprises activated carbon.

18. The catalyst of claim 1, wherein the non-organic porous substance comprises acetylene black.

19. The catalyst of claim 1, wherein the non-organic porous substance comprises silica/alumina.

20. The catalyst of claim 1, wherein the non-organic porous substance comprises titania.

21. The catalyst of claim 1, wherein the non-organic porous substance comprises zirconia.

* * * * *